(12) United States Patent
Amaiwa

(10) Patent No.: US 10,933,450 B2
(45) Date of Patent: Mar. 2, 2021

(54) VENT HOLE CLEANING APPARATUS AND VENT HOLE CLEANING METHOD

(71) Applicant: SUMITOMO RUBBER INDUSTRIES, LTD., Kobe (JP)

(72) Inventor: Yuichiro Amaiwa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 341 days.

(21) Appl. No.: 16/066,621

(22) PCT Filed: Dec. 12, 2016

(86) PCT No.: PCT/JP2016/086841
§ 371 (c)(1),
(2) Date: Jun. 27, 2018

(87) PCT Pub. No.: WO2017/126251
PCT Pub. Date: Jul. 27, 2017

(65) Prior Publication Data
US 2019/0001380 A1    Jan. 3, 2019

(30) Foreign Application Priority Data
Jan. 19, 2016 (JP) .............................. JP2016-008155

(51) Int. Cl.
| | | |
|---|---|---|
| *B08B 7/02* | (2006.01) | |
| *B29C 33/72* | (2006.01) | |
| *B29C 33/02* | (2006.01) | |
| *B08B 9/027* | (2006.01) | |
| *B29D 30/06* | (2006.01) | |

(52) U.S. Cl.
CPC .............. *B08B 7/028* (2013.01); *B08B 9/027* (2013.01); *B29C 33/02* (2013.01); *B29C 33/72* (2013.01);
(Continued)

(58) Field of Classification Search
None
See application file for complete search history.

(56) References Cited

U.S. PATENT DOCUMENTS 5,402,364 A * 3/1995 Kitoh ................... G01B 11/022
702/167
6,369,353 B1 * 4/2002 Soska ................... B08B 7/0042
219/121.68
(Continued)

FOREIGN PATENT DOCUMENTS

| EP | 0792731 A2 | 9/1997 |
| JP | 9-141672 A | 6/1997 |

(Continued)

OTHER PUBLICATIONS

Extended European Search Report, dated Jul. 5, 2019, for European Application No. 16886490.8, 6 pages.
(Continued)

*Primary Examiner* — Eric W Golightly
*Assistant Examiner* — Arlyn I Rivera-Cordero
(74) *Attorney, Agent, or Firm* — Birch, Stewart, Kolasch & Birch, LLP

(57) ABSTRACT

A vent hole cleaning method for cleaning a vent hole provided on a molding surface of a mold for vulcanizing a rubber product includes a step of detecting a shape of the molding surface; a step of calculating a position of the vent hole by comparing the shape of the molding surface obtained in the step of detecting with molding surface information stored in a controlling device in advance and including a position of the vent hole; a step of moving a cleaning means to the vent hole based on the calculated position of the vent hole; and a step of cleaning the vent hole by the cleaning means.

4 Claims, 6 Drawing Sheets

(52) U.S. Cl.
CPC .... *B29D 30/0662* (2013.01); *B08B 2209/027* (2013.01); *B29D 2030/0663* (2013.01)

(56) References Cited

U.S. PATENT DOCUMENTS

| | | |
|---|---|---|
| 2011/0298157 A1 | 12/2011 | Vossen |
| 2016/0263799 A1 | 9/2016 | Shiraishi |
| 2017/0182722 A1* | 6/2017 | Matsumura ............ B23K 26/36 |
| 2018/0319111 A1* | 11/2018 | Ishihara ............. B29D 30/0606 |

FOREIGN PATENT DOCUMENTS

| | | |
|---|---|---|
| JP | 2002-503551 A | 2/2002 |
| JP | 2008-62633 A | 3/2008 |
| JP | 2008-149603 A | 7/2008 |
| JP | 2016-150544 A | 8/2016 |
| JP | 2016-168732 A | 9/2016 |
| WO | WO 99/42228 A1 | 8/1999 |
| WO | WO 2010/094454 A1 | 8/2010 |
| WO | WO 2015/170750 A1 | 11/2015 |
| WO | WO 2015/1991130 A1 | 12/2015 |

OTHER PUBLICATIONS

International Search Report for PCT/JP2016/086841(PCT/ISA/210) dated Jan. 24, 2017 with an English translation, 5 pages.
Written Opinion of the International Searching Authority for PCT/JP2016/086841 (PCT/ISA/237) dated Jan. 24, 2017 with an English translation, 7 pages.

* cited by examiner

VENT HOLE CLEANING APPARATUS AND VENT HOLE CLEANING METHOD

TECHNICAL FIELD

The present invention relates to an apparatus for cleaning a vent hole provided on a molding surface of a mold for vulcanizing a rubber product, and a vent hole cleaning method.

BACKGROUND ART

Normally, a molding surface of a mold for vulcanizing a rubber product is provided with a plurality of vent holes. The vent holes are for releasing air inside the mold and gas generated from a rubber material to the outside.
It is likely that a fragment of the rubber material and a solidified product of the gas accumulate in the vent holes. In order to remove them, it is necessary to periodically clean the vent holes (see below Patent Literature 1, for example).

However, a plurality of the vent holes is arranged on the molding surface of the mold. And a diameter of each of the vent holes is small. Thereby, it is possible that, in the vent hole cleaning process, the operator misses some of the vent holes to be cleaned.
Patent Literature 1: Unexamined Japanese Patent Application Publication No. H09-141672

DISCLOSURE OF THE INVENTION

Problem to be Solved by the Invention

The present invention was made in view of the above, and a primary object thereof is to provide a vent hole cleaning apparatus and a vent hole cleaning method capable of accurately calculating positions of the vent holes and automatically cleaning the vent holes.

Means for Solving the Problem

The present invention is a vent hole cleaning apparatus for cleaning a vent hole provided on a molding surface of a mold for vulcanizing a rubber product characterized in that the apparatus comprises a detecting means for detecting a shape of the molding surface, a cleaning means for cleaning the vent hole, a controlling means for storing in advance molding surface information including shape information of the molding surface including a position of the vent hole and for calculating the position of the vent hole by comparing the shape of the molding surface obtained by the detecting means with the molding surface information, and a guiding means for moving the cleaning means based on the calculated position of the vent hole.

In the vent hole cleaning apparatus of the present invention, it is preferred that the detecting means includes a 3D laser sensor for measuring the three-dimensional shape of the molding surface.

In the vent hole cleaning apparatus of the present invention, it is preferred that the apparatus further comprises an imaging means for imaging the molding surface including the position of the vent hole calculated by the controlling means, wherein the controlling means calculates a movement amount of the cleaning means by comparing an image obtained by the imaging means with the molding surface information.

In the vent hole cleaning apparatus of the present invention, it is preferred that the cleaning means cleans the vent hole by ultrasonic vibration.

A second embodiment of the present invention is a vent hole cleaning method for cleaning a vent hole provided on a molding surface of a mold for vulcanizing a rubber product characterized in that the method comprises a step of detecting a shape of the molding surface, a step of calculating a position of the vent hole by comparing the shape of the molding surface obtained in the step of detecting with molding surface information stored in advance and including a position of the vent hole, a step of moving a cleaning means to the vent hole based on the calculated position of the vent hole, and a step of cleaning the vent hole by the cleaning means.

In the vent hole cleaning method of the present invention, it is preferred that in the step of detecting, a three-dimensional shape of the molding surface is measured by using a 3D laser sensor.

In the vent hole cleaning method of the present invention, it is preferred that the method further comprises a step of imaging the molding surface including the position of the vent hole after the position of the vent hole is calculated, and a step of calculating a movement amount of the cleaning means by comparing an image obtained in the step of imaging with the molding surface information.

In the vent hole cleaning method of the present invention, it is preferred that in the step of cleaning, the vent hole is cleaned by ultrasonic vibration.

Advantageous Effects of the Invention

The vent hole cleaning apparatus according to the present invention comprises the detecting means for detecting the shape of the molding surface, the cleaning means for cleaning the vent hole, the controlling means for storing in advance the molding surface information including the shape information of the molding surface including the position of the vent hole and for calculating the position of the vent hole by comparing the shape of the molding surface obtained by the detecting means with the molding surface information, and the guiding means for moving the cleaning means based on the calculated position of the vent hole.

The second embodiment of the present invention is the vent hole cleaning method for cleaning the vent hole comprising the step of detecting the shape of the molding surface, the step of calculating the position of the vent hole by comparing the shape of the molding surface obtained in the step of detecting with the molding surface information stored in advance and including the position of the vent hole, the step of moving the cleaning means to the vent hole based on the calculated position of the vent hole, and the step of cleaning the vent hole by the cleaning means.

In the vent hole cleaning apparatus and the vent hole cleaning method configured as such, the position of the vent hole is calculated by comparing the shape of the molding surface obtained by the detecting means with the molding surface information stored in advance and including the position of the vent hole, and the cleaning means is moved to the position, therefore, it is possible that the vent hole is surely cleaned.

Figure 1:
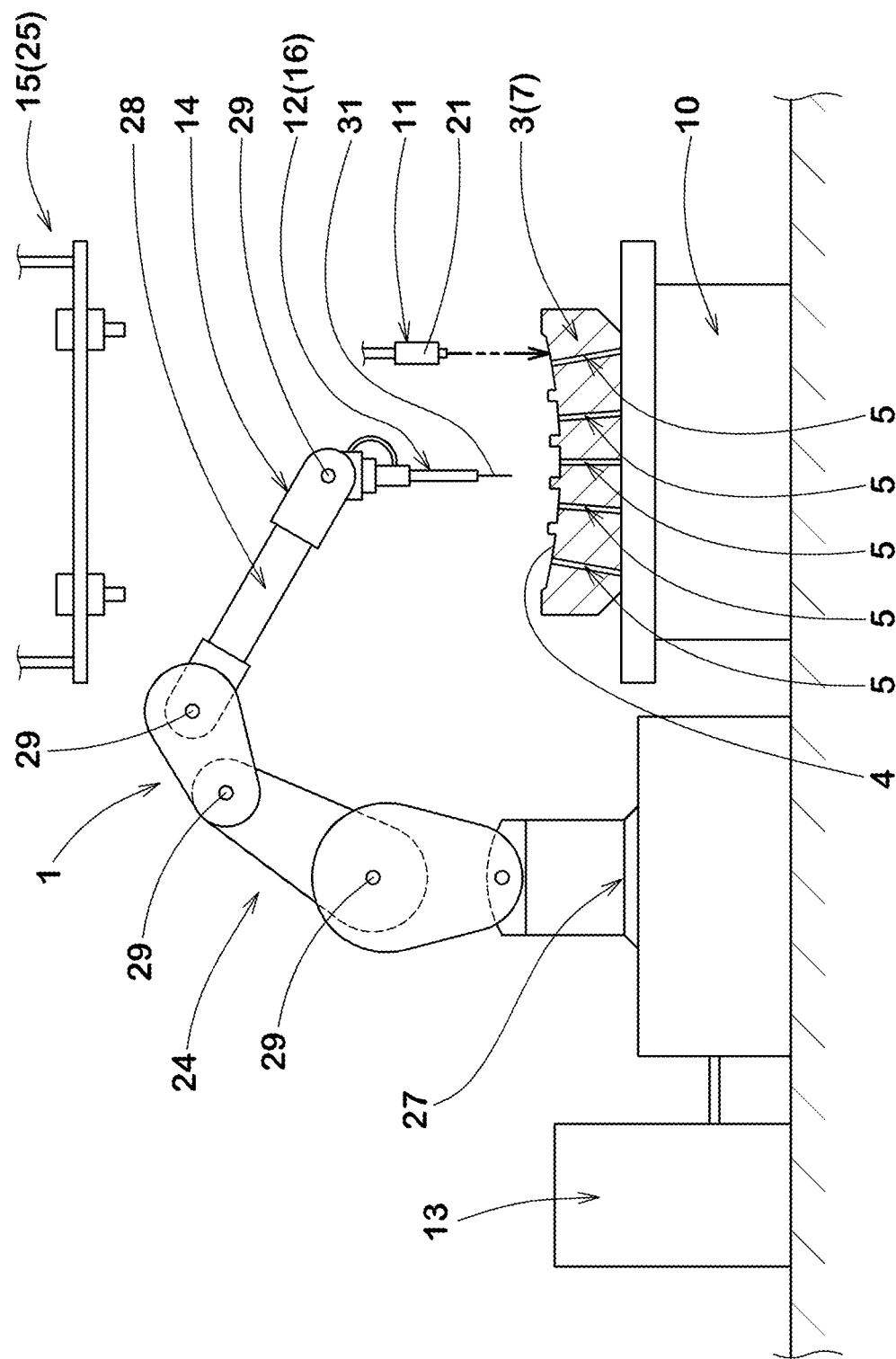
FIG. 1 a schematic view of a vent hole cleaning apparatus as an embodiment of the present invention.

DESCRIPTION OF THE REFERENCE SIGNS 1 apparatus
3 mold
4 molding surface
5 vent hole
11 detecting means
12 cleaning means
13 controlling means
14 guiding means

BEST MODE FOR CARRYING OUT THE INVENTION

An embodiment of the present invention will now be described in conjunction with accompanying drawings.

FIG. 1 is a schematic view of a vent hole cleaning apparatus (hereinafter may be simply referred to as "cleaning apparatus") 1 in this embodiment. The apparatus 1 is for cleaning vent holes provided on a molding surface of a mold for vulcanizing a rubber product.

Figure 2:
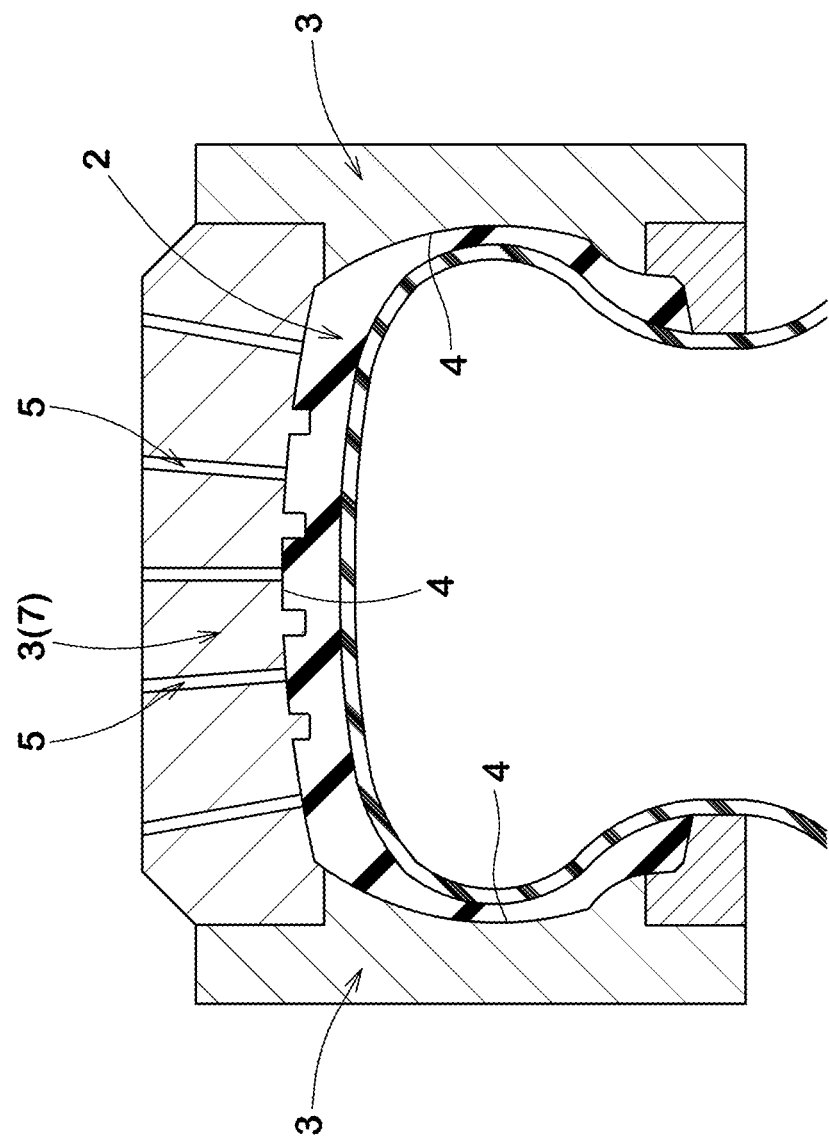
FIG. 2 a cross-sectional view of a mold for vulcanizing a tire as an example.

As shown in FIG. 2, the cleaning apparatus 1 in this embodiment is suitably used for cleaning vent holes 5 provided on a molding surface 4 of a mold 3 for vulcanizing a tire 2, for example.
The mold 3 used for vulcanization molding of the tire 2 is divided into a plurality of segments, for example.
Each of the segments is provided with about 50 vent holes 5, for example.
Note that only a part of the vent holes 5 provided in a tread segment 7 for forming a tread portion of the tire 2 is shown, in FIG. 2.

As shown in FIG. 1, the cleaning apparatus 1 in this embodiment has a workbench 10 on which the mold 3 is placed, for example. On the workbench 10, the mold 3 is placed with the molding surface 4 facing upward, for example. FIG. 1 shows a state in which the tread segment 7 shown in FIG. 2 is placed on the workbench. However, it is not limited to such an embodiment, the cleaning apparatus 1 may be one capable of working while the mold 3 is attached to a vulcanization molding machine or the like, for example. Hereinafter, the configuration of the cleaning apparatus 1 and a vent hole cleaning method by using the cleaning apparatus 1 (hereinafter may be simply referred to as "cleaning method") will be described.

The cleaning apparatus 1 includes a detecting means 11 for detecting the shape of the molding surface, a cleaning means 12 for cleaning the vent holes 5, a controlling means 13 for calculating the positions of the vent holes 5 provided in the mold 3, and a guiding means 14 for moving the cleaning means 12.

The detecting means 11 is supported freely movably by a robot arm (not shown), for example. The detecting means 11 can detect the shape of the molding surface 4 of the mold 3 and send the obtained information to the controlling means 13.

The detecting means 11 may be anything as long as it can detect the shape of the molding surface, and a detecting method by using various kinds of sensors or by imaging with a camera can be used, for example. In the detecting means 11 in this embodiment, a 3D laser sensor 21 for measuring the three-dimensional shape of the molding surface 4 is suitably used, for example. The 3D laser sensor 21 is excellent in detecting coordinates in a height direction of the molding surface and is useful for accurately detecting the molding surface with many irregularities.

Figure 3:
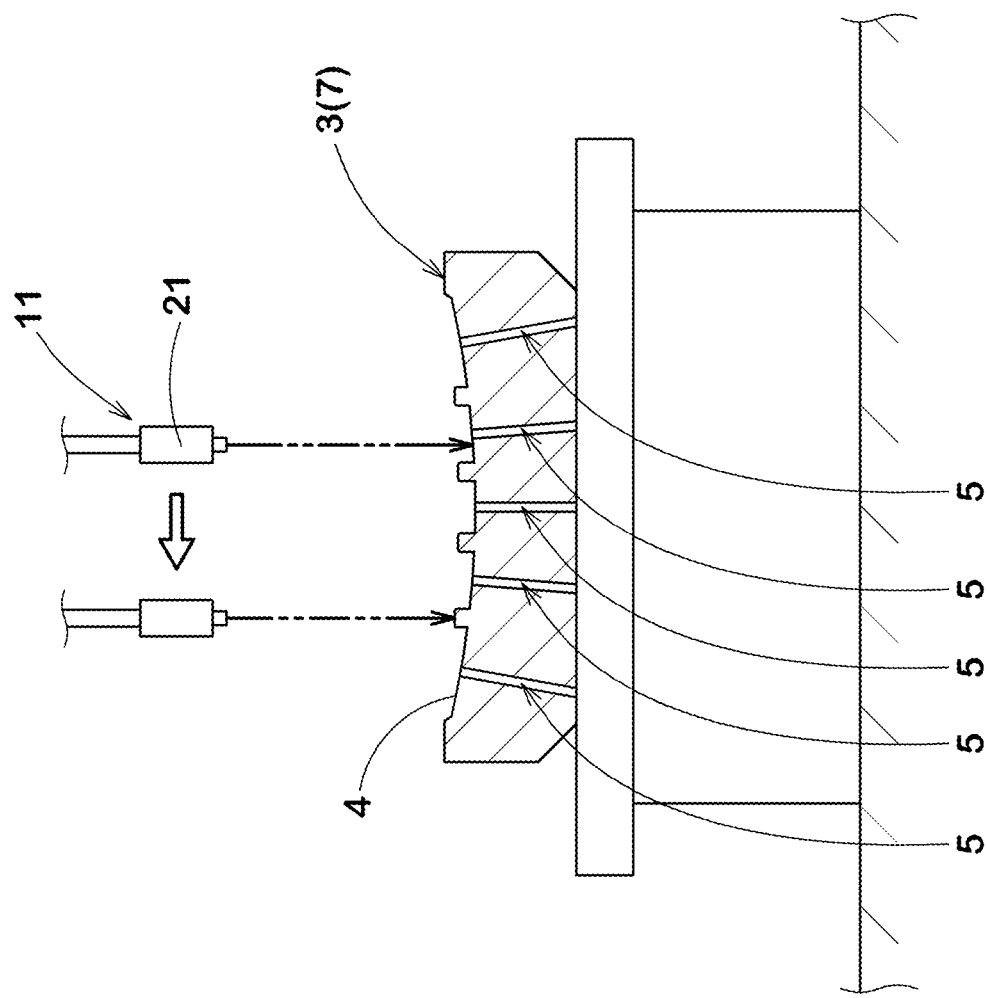
FIG. 3 a side view of a detecting means in operation.

FIG. 3 shows a side view of the detecting means 11 in operation. As shown in FIG. 3, in a first step of the cleaning method in this embodiment, while stroking the 3D laser sensor 21 in a first direction (lateral direction in FIG. 3), the robot arm moves the 3D laser sensor 21 along the molding surface 4 in a second direction orthogonal to the first direction. Thereby, the entire shape of the molding surface 4 of the mold 3 is detected. The detected information of the shape of the molding surface 4 is transmitted to the controlling means 13 (shown in FIG. 1, the same applies hereinafter).

As shown in FIG. 1, in the controlling means 13, molding surface information is stored in advance. The molding surface information includes shape information of the molding surface 4 including the positions of the vent holes 5. As a preferred embodiment, CAD data of the molding surface 4 is stored in the controlling means 13 in this embodiment, for example.

In a second step of the cleaning method in this embodiment, the controlling means 13 compares the actual shape of the molding surface 4 obtained by the detecting means 11 with the molding surface information stored in advance and calculates the positions of the vent holes 5.

The cleaning means 12 is for removing deposits in the vent holes 5. The cleaning means 12 includes various embodiments such as means for dissolving the deposits with liquid, means for blowing the deposits with high pressure gas, means for blowing powdery materials at high speed, or a method of inserting a metal wire into the vent holes 5 to remove the deposits, and the like, for example.

Figure 4:
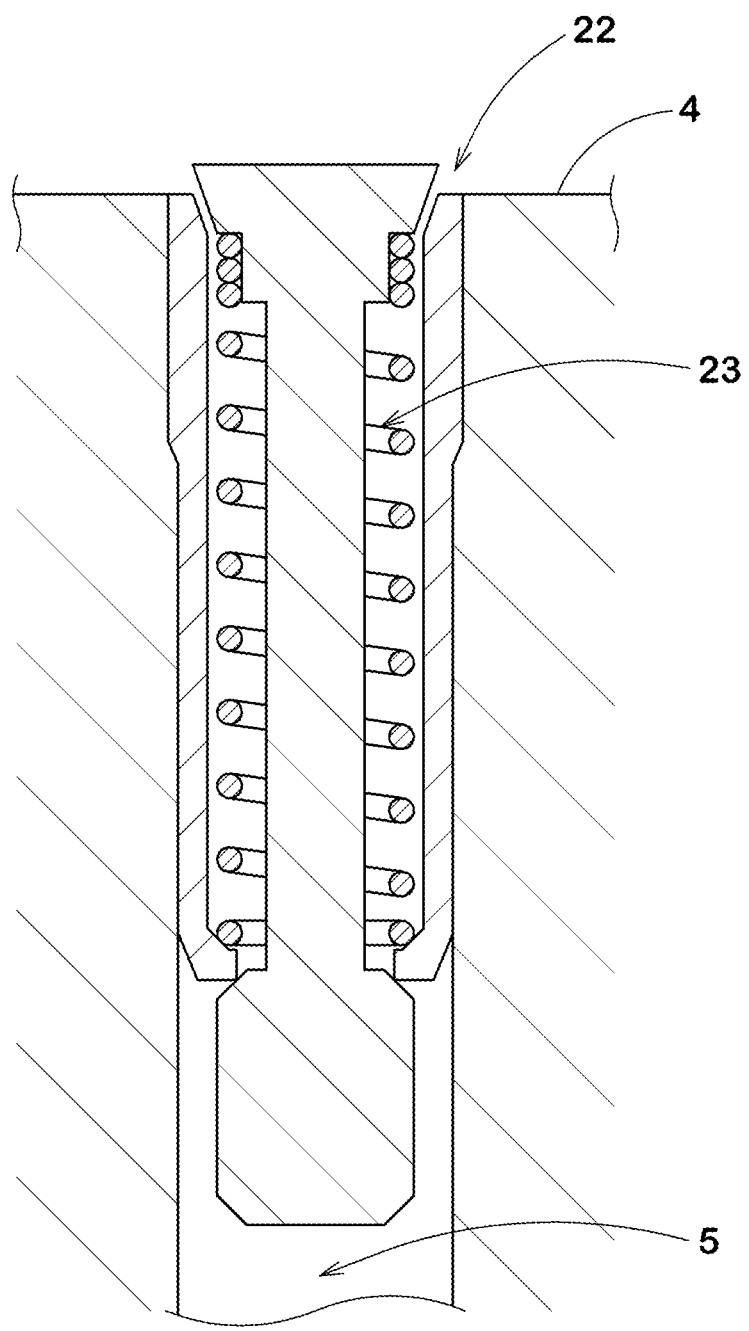
FIG. 4 a cross-sectional view of a spring vent.

With the cleaning means 12 in this embodiment, the interior of the vent hole 5 is cleaned by ultrasonic vibration generated by a probe 31 extending straight in a tapered manner, for example. The cleaning means 12 configured as such can effectively clean the vent holes 5 each provided with a spring vent 22 as shown in FIG. 4, for example. The spring vent 22 is often used for the vent hole 5 of the tread segment 7 (shown in FIG. 2), for example, in order to prevent spew from being formed on an outer surface of the tire. In the spring vent 22, the deposits are likely to accumulate in the vicinity of the inner spring 23. The cleaning means 12 in this embodiment can effectively remove the deposits by the ultrasonic vibration.

As shown in FIG. 1, the cleaning means 12 is supported freely movably by the guiding means 14. A polyarticular robot arm 24 is used as the guiding means 14 in this embodiment, for example. The robot arm 24 in this embodiment includes a turning unit 27 disposed on a base portion, a plurality of pivot points 29, and an extendable portion 28, for example. Thereby, the robot arm 24 in this embodiment can move the cleaning means 12 provided at a tip thereof to any part of the molding surface 4 of the mold 3. Moreover, the robot arm 24 in this embodiment can move the cleaning means 12 in any direction of three dimensions with respect to the mold 3. However, the guiding means 14 is not limited to such an embodiment.

In a third step of the cleaning method in this embodiment, the guiding means 14 operates based on the positions of the vent holes 5 calculated by the controlling means 13, and moves the cleaning means 12 to the vent holes 5. Thereafter, in a fourth step, the cleaning means 12 cleans the vent holes 5. As described above, in this embodiment, by comparing the actual shape of the molding surface 4 obtained by the detecting means 11 with the molding surface information stored in advance, the positions of the vent holes 5 are accurately calculated. Therefore, in this embodiment, it is possible that the positions of the vent holes 5 are surely calculated, therefore, an oversight of the vent holes 5 is suppressed. Moreover, even in a situation where the vent holes 5 are easily overlooked, such as when the mold is very dirty, the vent holes 5 are surely cleaned.

As a further preferred embodiment, the cleaning method in this embodiment includes a step of imaging the molding surface 4 including the positions of the vent holes 5 by an imaging means 15 (hereinafter may be referred to as "imaging step") after the above-described second step.

Figure 5:
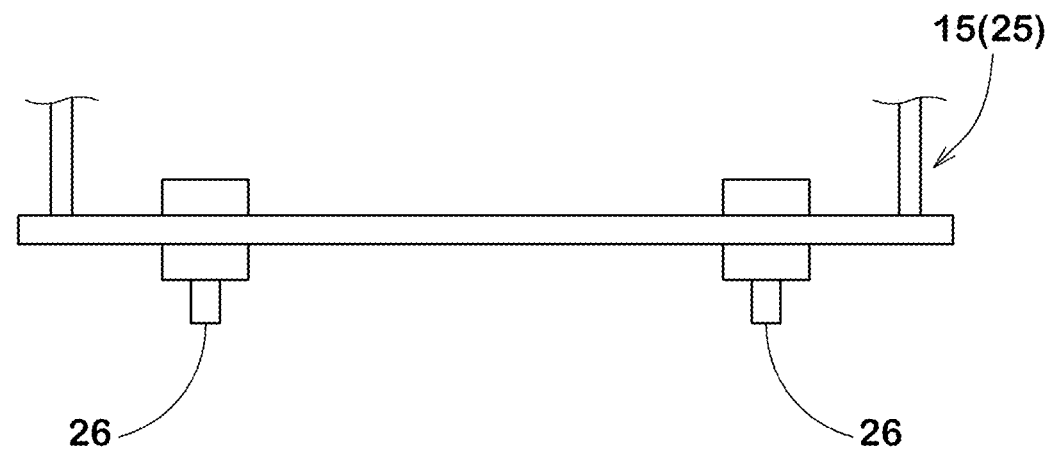
FIG. 5 a side view of an imaging means in operation.
Figure 5:
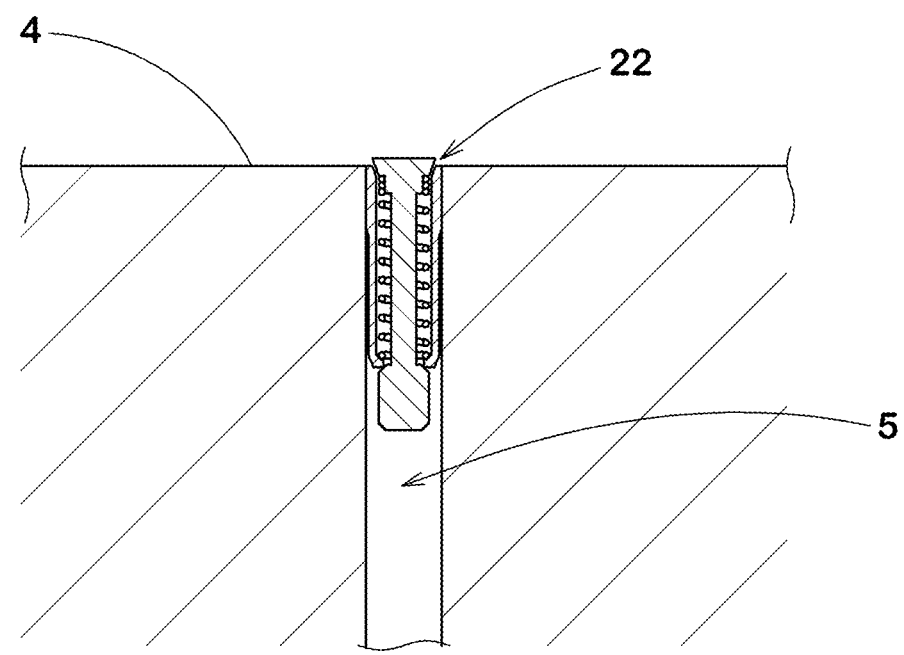

FIG. 5 is a schematic view of the imaging means 15 in operation. As shown in FIG. 5, it is preferred that the imaging means 15 includes a dual camera 25, for example. The dual camera 25 can stereoscopically image the molding surface 4 with two lenses 26, 26.

In this embodiment, it is preferred that, after the imaging step, the controlling means 13 calculates a movement amount of the cleaning means 12 by comparing the image obtained in this step with the molding surface information stored in advance.

In the vent hole cleaning method in this embodiment including the imaging step configured as such, even when the vent holes 5 are provided with the spring vents 22, for example, the vent holes 5 are not overlooked, therefore, it is possible that the vent holes 5 are surely cleaned.

Figure 6A:
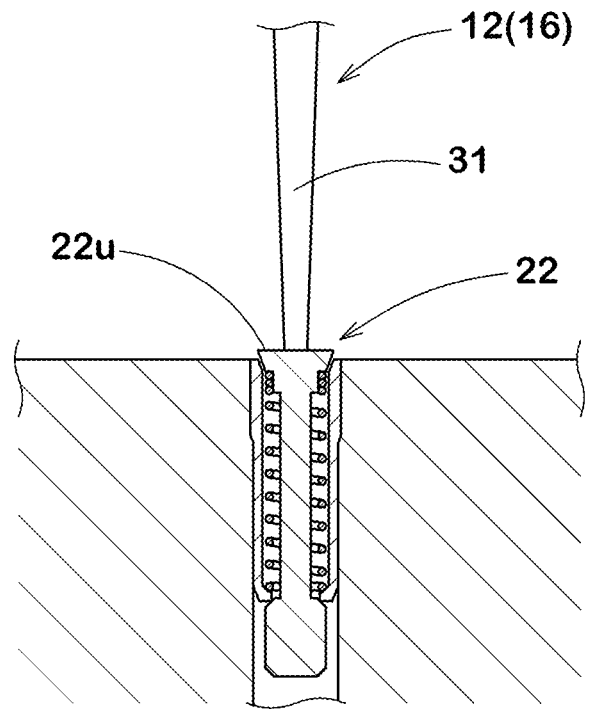
FIGS. 6 (a) and (b) are side views of a probe pushing an upper portion of the spring vent.
Figure 6B:
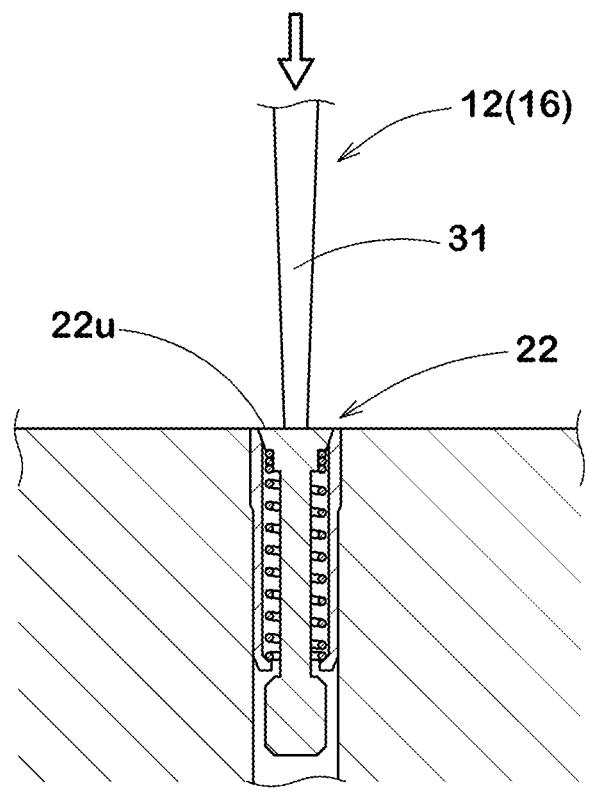

In a further preferred embodiment, the cleaning means 12 (shown in FIG. 1) includes a cleaning confirmation unit 16 for the spring vents 22, for example. FIGS. 6(*a*) and 6(*b*) are side views of the cleaning confirmation unit 16 in operation. As shown in FIG. 6(*a*), the cleaning confirmation unit 16 includes a force sensor (not shown) for measuring force applied in a longitudinal direction of the probe 31, for example. The force sensor measures the force applied in the longitudinal direction of the probe 31. After the spring vents 22 are cleaned, the cleaning confirmation unit 16 pushes an upper portion 22*u* of each of the spring vents 22 with the probe 31 and automatically checks whether the spring vents 22 can be closed with force smaller than predetermined force. As shown in FIG. 6(*b*), when the probe 31 can close the spring vent 22 with the predetermined force, the cleaning confirmation unit 16 judges that the cleaning of the inside of the spring vent 22 has been completed. When the probe 31 cannot close the spring vent 22 with the predetermined force, the cleaning confirmation unit 16 judges that the cleaning of the inside has not been completed. Thereby, it is possible that the cleaning confirmation unit 16 automatically determines whether the cleaning of the spring vents 22 has been completed.

In another embodiment of the present invention, the dual camera 25 may be used as the detecting means 11, for example, instead of the 3D laser sensor 21, for example. The dual camera 25 is capable of three-dimensionally imaging the molding surface 4 with the two lenses 26, 26. The dual camera 25 can detect the molding surface 4 in a shorter time than the above-mentioned 3D laser sensor, therefore, it is useful for improving the operational efficiency.

While detailed description has been made of the vent hole cleaning apparatus and the vent hole cleaning method as an embodiment of the present invention, the present invention can be embodied in various forms without being limited to the illustrated embodiments.

The invention claimed is:

1. A vent hole cleaning method for cleaning a vent hole provided on a molding surface of a mold for vulcanizing a rubber product comprising:
   a step of detecting a shape of the molding surface;
   a step of calculating a position of the vent hole by comparing the shape of the molding surface obtained in the step of detecting with molding surface information stored in a controlling device in advance and including a position of the vent hole;
   a step of moving a cleaning means to the vent hole based on the calculated position of the vent hole; and
   a step of cleaning the vent hole by the cleaning means.

2. The vent hole cleaning method according to claim 1, wherein
   in the step of detecting, a three-dimensional shape of the molding surface is measured by using a 3D laser sensor.

3. The vent hole cleaning method according to claim 1 further comprising:
   a step of imaging the molding surface including the position of the vent hole after the position of the vent hole is calculated; and
   a step of calculating a movement amount of the cleaning means by comparing an image obtained in the step of imaging with the molding surface information.

4. The vent hole cleaning method according to claim 1, wherein
   in the step of cleaning, the vent hole is cleaned by ultrasonic vibration.

\* \* \* \* \*